(12) United States Patent
Zhang et al.

(10) Patent No.: US 12,353,081 B2
(45) Date of Patent: Jul. 8, 2025

(54) DISPLAYING MODULE AND DISPLAYING DEVICE

(71) Applicants: FUZHOU BOE OPTOELECTRONICS TECHNOLOGY CO., LTD., Fujian (CN); BOE Technology Group Co., Ltd., Beijing (CN)

(72) Inventors: Han Zhang, Beijing (CN); Kai Diao, Beijing (CN); Ming Chen, Beijing (CN); Hongyu Zhao, Beijing (CN); Dingjie Zheng, Beijing (CN); Hui Yu, Beijing (CN); Shuwen Lai, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,824

(22) PCT Filed: Apr. 29, 2022

(86) PCT No.: PCT/CN2022/090373
§ 371 (c)(1),
(2) Date: Feb. 17, 2023

(87) PCT Pub. No.: WO2023/206390
PCT Pub. Date: Nov. 2, 2023

(65) Prior Publication Data
US 2025/0076694 A1    Mar. 6, 2025

(51) Int. Cl.
*G02F 1/1333* (2006.01)
*F21V 8/00* (2006.01)

(52) U.S. Cl.
CPC ..... *G02F 1/133314* (2021.01); *G02B 6/0088* (2013.01); *G02F 1/133322* (2021.01)

(58) Field of Classification Search
CPC ......... G02F 1/133314; G02F 1/133322; G02B 6/0088
See application file for complete search history.

(56) References Cited

U.S. PATENT DOCUMENTS

2015/0160407 A1    6/2015  Hsiao et al.
2015/0346538 A1*  12/2015  Hsiao ................ G02F 1/133308
                                                          312/7.2
2019/0271874 A1    9/2019  Fu et al.

FOREIGN PATENT DOCUMENTS

CN    101493209 A    7/2009
CN    103672614 A    3/2014
(Continued)

*Primary Examiner* — Anne M Hines
(74) *Attorney, Agent, or Firm* — WHDA, LLP

(57) ABSTRACT

A displaying module includes a back plate, a light guide plate fixed to the back plate, a plastic frame covering the back plate and a display panel located on the plastic frame, the plastic frame is of a shape of an annular frame, and the plastic frame includes a bearing face. A first position of the bearing face of the plastic frame is a curved surface, and the curved surface curves in a direction further away from the display panel, whereby a warping degree of the curved surface is a first warping degree, wherein the first position is a position of the bearing face that faces a second position of the display panel, the second position is a position of a region of the display panel where light leakage happens, and the first warping degree is equal to a warping degree of the display panel when the display panel curves.

15 Claims, 5 Drawing Sheets

(56) References Cited

FOREIGN PATENT DOCUMENTS

| | | |
|---|---|---|
| CN | 103941455 A | 7/2014 |
| CN | 206411364 U | 8/2017 |
| CN | 108257507 A | 7/2018 |

* cited by examiner

DISPLAYING MODULE AND DISPLAYING DEVICE

CROSS-REFERENCE TO RELATED APPLICATION

The present disclosure is a National Stage of International Application No. PCT/CN2022/090373, filed on Apr. 29, 2022, with the title of "DISPLAYING MODULE AND DISPLAYING DEVICE", which is incorporated herein in its entirety by reference.

TECHNICAL FIELD

The present disclosure relates to the technical field of displaying, and particularly relates to a displaying module and a displaying device.

BACKGROUND

With the development of displaying modules, displaying modules having a curved surface have already become a development trend. In the displaying modules having a curved surface, usually the display panel is carried on a backlight component of a particular curvature, wherein the curving trend of the displaying module depends on the curving trend of the backlight component, and the curving trend of the backlight component is mainly decided by the metal back plate and the plastic frame of the backlight component.

However, when the display panel is pressed or squeezed, the periphery of the display panel has slight deformation, which causes that the stress is concentrated at the corners of the display panel, and therefore the liquid crystal of the display panel is locally distorted at the corners, whereby a dark-state light leakage happens at the corners of the display panel, to affect the effect of displaying of the displaying module.

SUMMARY

An embodiment of the present disclosure provides a displaying module and a displaying device, to solve the problem in the related art that the display panel of the displaying modules has a dark-state light leakage at the corners.

In order to solve the above technical problem, the present disclosure is realized as follows:

In the first aspect, an embodiment of the present disclosure provides a displaying module, the displaying module comprising a back plate, a light guide plate fixed to the back plate, a plastic frame covering the back plate and a display panel located on the plastic frame, wherein the plastic frame is of a shape of an annular frame, and the plastic frame comprises a bearing face, a bottom face opposite to the bearing face, and an inner annular face perpendicular to the bottom face;

the display panel covers the bearing face, the bottom face abuts the back plate, and the light guide plate is fixed in a fixing space enclosed by the inner annular face; and
a first position of the bearing face of the plastic frame is a curved surface, and the curved surface curves in a direction further away from the display panel, whereby a warping degree of the curved surface is a first warping degree, wherein the first position is a position of the bearing face that faces a second position of the display panel, the second position is a position of a region of the display panel where light leakage happens, and the first warping degree is equal to a warping degree of the display panel when the display panel curves.

Optionally, the plastic frame is a square plastic frame, four corners of the plastic frame include at least one curved-surface corner, a bearing face of the curved-surface corner is a curved surface, and a length of two sides intersecting at the curved-surface corner is a first length, wherein the first length is a distance between two facing lateral sides of the region of the display panel where light leakage happens.

Optionally, the curved-surface corner comprises a first warping face and a second warping face;
the first warping face and the second warping face intersect, a projection of the first warping face in a direction perpendicular to a displaying face of the display panel is located at a position where a longer side edge of the display panel is located, and a projection of the second warping face in the direction perpendicular to the displaying face of the display panel is located at a position where a shorter side edge of the display panel is located, wherein the longer side edge and the shorter side edge are two intersecting sides of the display panel, and a length of the longer side edge is greater than a length of the shorter side edge; and
both of the first warping face and the second warping face curve in the direction further away from the display panel.

Optionally, if a light-leakage amount of the displaying module is a first light-leakage amount, a warping degree of the first warping face is a second warping degree;
if a light-leakage amount of the display panel is a second light-leakage amount, the warping degree of the first warping face is a third warping degree; and
if the light-leakage amount of the display panel is a third light-leakage amount, the warping degree of the first warping face is a fourth warping degree, wherein the second light-leakage amount is within a preset light-leakage range of the display panel, the first light-leakage amount is less than the second light-leakage amount, and the third light-leakage amount is greater than the second light-leakage amount; and
the second warping degree is less than the third warping degree, and the third warping degree is less than the fourth warping degree.

Optionally, if the light-leakage amount of the display panel is the first light-leakage amount, a brightness of a light leaking site of the region of the display panel where light leakage happens is less than 0.4 nit;
if a light-leakage amount of the display panel is a second light-leakage amount, the brightness of the light leaking site of the region of the display panel where light leakage happens is greater than or equal to 0.4 nit, and less than 0.6 nit; and
if the light-leakage amount of the display panel is a third light-leakage amount, the brightness of the light leaking site of the region of the display panel where light leakage happens is greater than or equal to 0.6 nit.

Optionally, if the warping degree of the first warping face is the second warping degree, a connecting line between an end of the curved surface and an end of a flat face of the bearing face is a first curve, and if the warping degree of the first warping face is the fourth warping degree, a connecting line between the end of the curved surface and the end of the flat face of the bearing face is a second curve; and
both of the first curve and the second curve are tangent to the end of the flat face of the bearing face, and a curvature of the first curve is less than a curvature of the second curve, wherein the flat face of the bearing face is a face of the bearing face other than the curved surface, the end of the flat face refers to one end of the flat face that is closer to the curved surface, and the end of the curved surface refers to one end of the curved surface that is further from the flat face.

Optionally, if the warping degree of the first warping face is the third warping degree, a connecting line between an end of the curved surface and an end of a flat face of the bearing face is a first straight line;
 wherein the flat face of the bearing face is a face of the bearing face other than the curved surface, the end of the flat face refers to one end of the flat face that is closer to the curved surface, and the end of the curved surface refers to one end of the curved surface that is further from the flat face.

Optionally, if the warping degree of the first warping face is the second warping degree, a distance between the end of the curved surface and the flat face is a first distance;
 if the warping degree of the first warping face is the third warping degree, the distance between the end of the curved surface and the flat face is a second distance; and
 if the warping degree of the first warping face is the fourth warping degree, the distance between the end of the curved surface and the flat face is a third distance;
 wherein the first distance is less than the second distance, and the second distance is less than the third distance, wherein the end of the flat face refers to one end of the flat face that is closer to the curved surface, and the end of the curved surface refers to one end of the curved surface that is further from the flat face.

Optionally, the second distance is equal to a first numerical value, wherein the first numerical value refers to a deviation amount of the bearing face in the direction further away from the display panel when the light-leakage amount of the display panel is within the preset light-leakage range.

Optionally, if a light-leakage amount of the display panel is a first light-leakage amount, a warping degree of the second warping face is a fifth warping degree;
 if a light-leakage amount of the display panel is a second light-leakage amount, the warping degree of the second warping face is a sixth warping degree; and
 if the light-leakage amount of the display panel is a third light-leakage amount, the warping degree of the second warping face is a seventh warping degree, wherein the second light-leakage amount refers to an average value of the light-leakage amount when the display panel has light leakage, the first light-leakage amount is less than the second light-leakage amount, and the third light-leakage amount is greater than the second light-leakage amount; and
 the fifth warping degree is less than the sixth warping degree, and the sixth warping degree is less than the seventh warping degree.

Optionally, if the warping degree of the second warping face is the fifth warping degree, a connecting line between an end of the curved surface and an end of a flat face of the bearing face is a third curve, and if the warping degree of the second warping face is the seventh warping degree, a connecting line between the end of the curved surface and the end of the flat face of the bearing face is a fourth curve; and
 both of the third curve and the fourth curve are tangent to the end of the flat face of the bearing face, and a curvature of the third curve is less than a curvature of the fourth curve, wherein the flat face of the bearing face is a face of the bearing face other than the curved surface, the end of the flat face refers to one end of the flat face that is closer to the curved surface, and the end of the curved surface refers to one end of the curved surface that is further from the flat face.

Optionally, if the warping degree of the second warping face is the sixth warping degree, a connecting line between an end of the curved surface and an end of a flat face of the bearing face is a second straight line;
 wherein the flat face of the bearing face is a face of the bearing face other than the curved surface, the end of the flat face refers to one end of the flat face that is closer to the curved surface, and the end of the curved surface refers to one end of the curved surface that is further from the flat face.

Optionally, if the warping degree of the second warping face is the fifth warping degree, a distance between the end of the curved surface and the flat face is a fourth distance;
 if the warping degree of the second warping face is the sixth warping degree, the distance between the end of the curved surface and the flat face is a fifth distance; and
 if the warping degree of the second warping face is the seventh warping degree, the distance between the end of the curved surface and the flat face is a sixth distance;
 wherein the fourth distance is less than the fifth distance, and the fifth distance is less than the sixth distance, wherein the end of the flat face refers to one end of the flat face that is closer to the curved surface, and the end of the curved surface refers to one end of the curved surface that is further from the flat face.

Optionally, the sixth distance is equal to a second numerical value, wherein the second numerical value refers to a deviation amount of the bearing face in the direction further away from the display panel when the light-leakage amount of the display panel is within the preset light-leakage range.

Optionally, a warping degree of the first warping face is equal to a warping degree of the second warping face.

Optionally, all of the four corners of the plastic frame are the curved-surface corner.

In the second aspect, an embodiment of the present disclosure further provides a displaying device, wherein the displaying device comprises the displaying module according to any one of the embodiments in the first aspect.

It can be seen from the above embodiments that, in the embodiments of the present disclosure, the first position of the bearing face of the plastic frame is a curved surface, and the curved surface curves in the direction further away from the display panel, whereby the warping degree of the curved surface is the first warping degree, wherein the first position is the position of the bearing face that faces the second position of the display panel, and the second position refers to the position where the region between two facing lateral sides of the region of the display panel where light leakage happens is located. Therefore, the curved surface of the bearing face of the frame and the region of the display panel where light leakage happens are in facing positions. Accordingly, when the display panel is pressed or squeezed and thus is deformed, the curved surface at the first position of the bearing face of the plastic frame can cause the stress to be dispersed, to prevent stress concentration, which reduces the stress at the corners of the display panel, thereby ameliorating the problem of light leakage of the displaying module, to improve the effect of displaying of the displaying module.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are embodiments of the present disclosure, and a person skilled in the art can obtain other figures according to these figures without paying creative work.

REFERENCE NUMBERS

1: plastic frame; 2: light guide plate; 11: bearing face; 111: curved-surface corner; 1111: first warping face; 1112: second warping face; 11111: first curve; 11112: second curve; 11113: first straight line; 11114: first distance; 11115: second distance; 11116: third distance; 11121: third curve; 11122: fourth curve; 11123: second straight line; 11124: fourth distance; 11125: fifth distance; and 11126: sixth distance.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be understood that the "one embodiment" or "an embodiment" as used throughout the description means that particular features, structures or characteristics with respect to the embodiments are included in at least one embodiment of the present disclosure. Therefore, the "in one embodiment" or "in an embodiment" as used throughout the description does not necessarily refer to the same embodiment. Furthermore, those particular features, structures or characteristics may be combined in one or more embodiments in any suitable form.

Figure 1:
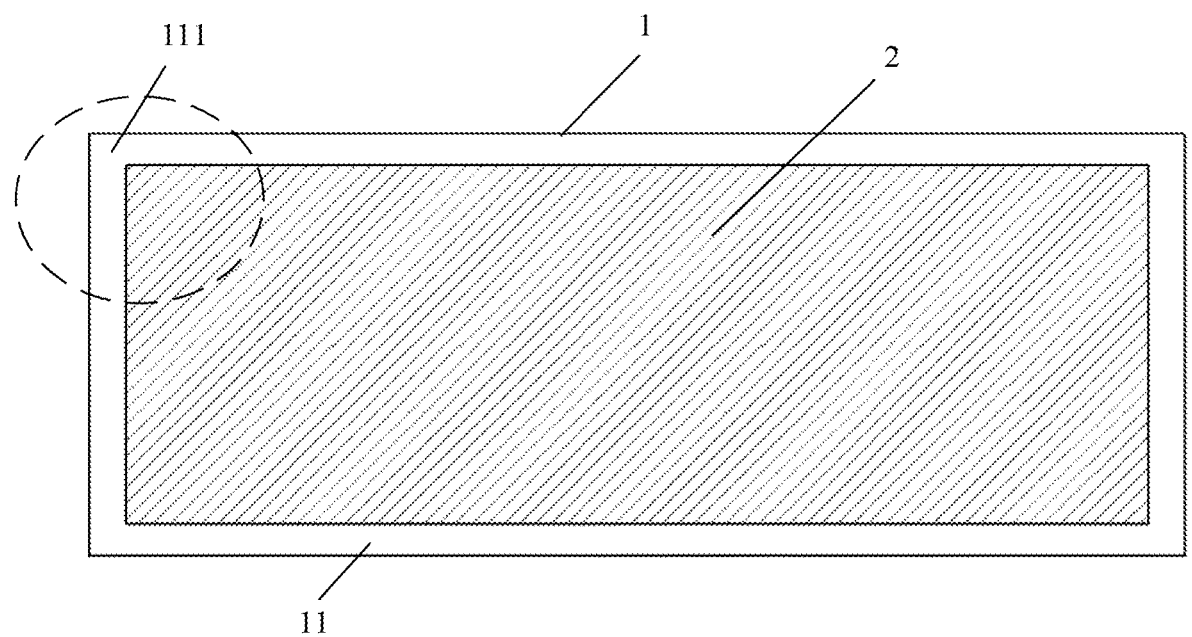
FIG. 1 illustrates a schematic diagram of the local assembling of a displaying module according to an embodiment of the present disclosure.
Figure 2:
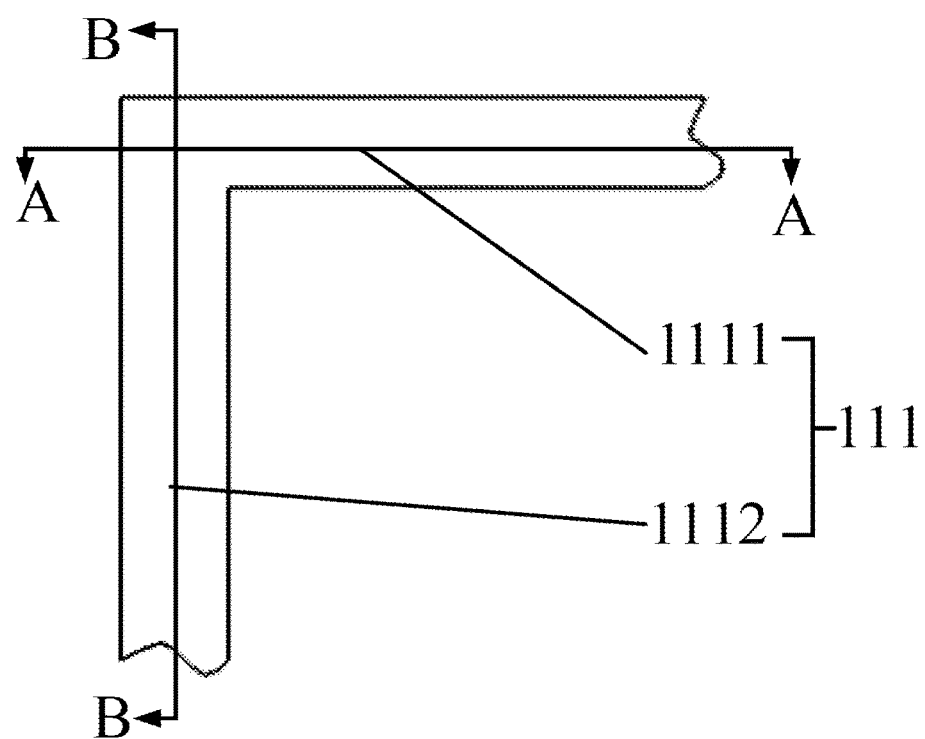
FIG. 2 illustrates a schematic structural diagram of a curved-surface corner according to an embodiment of the present disclosure.
Figure 3:
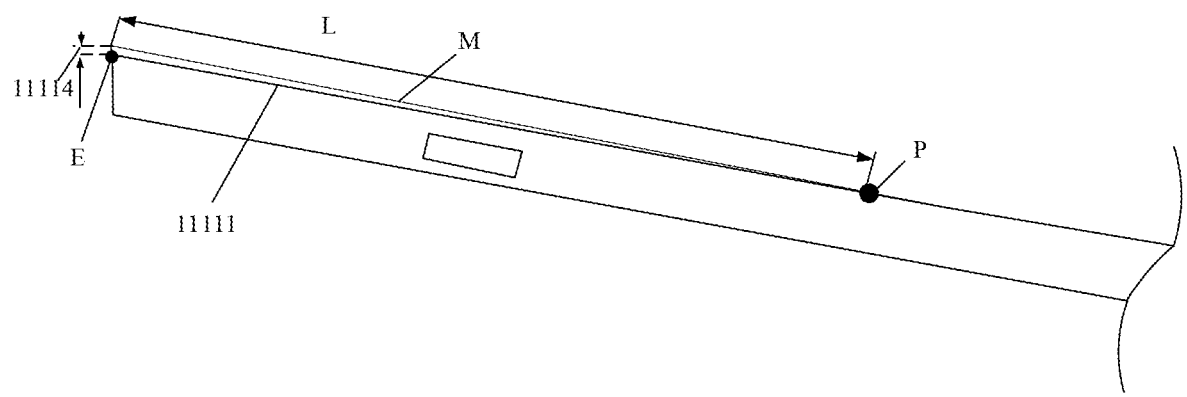
FIG. 3 illustrates a first schematic cross-sectional view along the A-A in FIG. 2 of the first warping face of the plastic frame according to an embodiment of the present disclosure.

Referring to FIGS. 1, 2 and 3, an embodiment of the present disclosure provides a displaying module. The displaying module comprises a back plate, a light guide plate 2 fixed to the back plate, a plastic frame 1 covering the back plate and a display panel located on the plastic frame 1, the plastic frame 1 is of a shape of an annular frame, and the plastic frame 1 comprises a bearing face 11, a bottom face opposite to the bearing face 11, and an inner annular face perpendicular to the bottom face. The display panel covers the bearing face 11, the bottom face abuts the back plate, and the light guide plate 2 is fixed in a fixing space enclosed by the inner annular face. A first position of the bearing face 11 of the plastic frame 1 is a curved surface, and the curved surface curves in the direction further away from the display panel, whereby the warping degree of the curved surface is a first warping degree, wherein the first position is the position of the bearing face 11 that faces a second position of the display panel, the second position is the position of the region of the displaying module where light leakage happens, and the first warping degree is equal to the warping degree of the display panel when the display panel curves.

The back plate is the component for providing support to the displaying module. In an embodiment of the present disclosure, the back plate may be any one of a stamped-metal back plate, a glass back plate and a composite-material back plate. In order to ensure that the back plate has an excellent heat-dissipation property, the back plate may be a composite-material back plate. In the installation, it is required to control the gap between the heat emitting components of the displaying module and the back plate, to ensure the transferring of the heat.

The light guide plate 2 uses an optical-grade acrylic plate as the basic raw material. Subsequently, by using a material that has an extremely high reflectivity and does not absorb light, light guiding dots are printed on the bottom face of the optical-grade acrylic plate, so that the light guide plate 2 can absorb the light emitted by the light emitting components.

When the display panel is pressed or squeezed, the periphery of the display panel has slight deformation, and therefore the liquid crystal of the display panel is locally distorted. Therefore, when the display panel displays a black frame, a dark-state light leakage happens.

In view of that, in an embodiment of the present disclosure, the plastic frame 1 comprises a bearing face 11, a bottom face opposite to the bearing face 11, and a side face perpendicular to the bottom face. It should be noted that the bearing face 11 is the surface of the plastic frame 1 that bears the display panel, and the bottom face is the surface that abuts the back plate. The plastic frame 1 may be a circular plastic frame, may also be a square plastic frame, and may also be a plastic frame of another shape. The shape of the plastic frame 1 is determined according to the shape of the light guide plate 2, which is not limited in the embodiments of the present disclosure. The fixing space enclosed by the inner annular face of the plastic frame 1 is determined according to the shape of the plastic frame 1. As an example, if the light guide plate 2 is a rectangular light guide plate, then the plastic frame 1 is a rectangular annular plastic frame, the inner annular face of the plastic frame 1 is rectangular, and the space enclosed by the inner annular face of the plastic frame 1 is a cuboid. If the light guide plate 2 is a circular light guide plate, then the plastic frame 1 is a circular annular plastic frame, the inner annular face of the plastic frame 1 is circular, and the space enclosed by the inner annular face of the plastic frame 1 is cylindrical.

Furthermore, the bearing face 11 perpendicular to the inner annular face of the plastic frame 1 is the surface of the plastic frame 1 that bears the display panel; in other words, the bearing face 11 of the plastic frame 1 contacts the display panel. The first position of the bearing face 11 of the plastic frame 1 is a curved surface, and the curved surface curves in the direction further away from the display panel, whereby the warping degree of the curved surface is the first warping degree. Because the first position is the position of the bearing face 11 that faces the second position of the display panel, and the second position is the position of the region of the display panel where light leakage happens, the curved surface of the bearing face 11 of the plastic frame 1 and the region of the display panel where light leakage happens are in facing positions. Accordingly, the first position of the bearing face 11 of the plastic frame 1 can be used to absorb the deformation caused when the display panel is pressed or squeezed.

It can be seen from the above embodiments that, in the embodiments of the present disclosure, the first position of the bearing face 11 of the plastic frame 1 is a curved surface, and the curved surface curves in the direction further away from the display panel, whereby the warping degree of the curved surface is the first warping degree, wherein the first position is the position of the bearing face 11 that faces the second position of the display panel, and the second position refers to the position where the region between two facing lateral sides of the region of the display panel where light leakage happens is located. Therefore, the curved surface of the bearing face 11 of the frame and the region of the display panel where light leakage happens are in facing positions. Accordingly, when the display panel is pressed or squeezed and thus is deformed, the curved surface at the first position of the bearing face 11 of the plastic frame 1 can cause the stress to be dispersed, to prevent stress concentration, which reduces the stress at the corners of the display panel, thereby ameliorating the problem of light leakage of the displaying module, to improve the effect of displaying of the displaying module.

Taking the case as an example in which the plastic frame 1 is a square plastic frame, the bearing face 11 of the plastic frame 1 will be particularly described in detail below.

In some embodiments, the plastic frame 1 is a square plastic frame, the four corners of the plastic frame 1 include at least one curved-surface corner 111, a bearing face 11 of the curved-surface corner 111 is a curved surface, and the length of two sides intersecting at the curved-surface corner 111 is a first length, wherein the first length is the distance between two facing lateral sides of the region of the display panel where light leakage happens.

It should be noted that, if the plastic frame 1 is a square plastic frame, the positions that face the region of the display panel where light leakage happens are located at the four corners of the plastic frame 1. In other words, it is merely required to ensure that one corner of the four corners of the plastic frame 1 is a curved-surface corner 111, and then the problem of light leakage of the display panel can be ameliorated. The four corners of the plastic frame 1 refer to the positions where the four intersection points between the two longer side edges and the two shorter side edges of the plastic frame 1 are located. The length of the two intersecting sides of the curved-surface corner 111 and the distance between the two facing lateral sides of the region of the display panel where light leakage happens are equal, whereby the curved-surface corner 111 and the region where the region of the display panel where light leakage happens is located are in facing positions. Accordingly, the curved-surface corner 111 can cause the stress to be dispersed, to prevent stress concentration, which reduces the stress at the corners of the display panel, thereby ameliorating the problem of light leakage of the displaying module, to improve the effect of displaying of the displaying module. The first length refers to the length as shown by the L in FIGS. 3 to 8.

Particularly, the curved-surface corner 111 comprises a first warping face 1111 and a second warping face 1112. The first warping face 1111 and the second warping face 1112 intersect, the projection of the first warping face 1111 in the direction perpendicular to the displaying face of the display panel is located at the position where a longer side edge of the display panel is located, the projection of the second warping face 1112 in the direction perpendicular to the displaying face of the display panel is located at the position where a shorter side edge of the display panel is located, wherein the longer side edge and the shorter side edge are two intersecting sides of the display panel, and the length of the longer side edge is greater than the length of the shorter side edge. Both of the first warping face 1111 and the second warping face 1112 curve in the direction further away from the display panel.

It should be noted that that the projection of the first warping face 1111 in the direction perpendicular to the displaying face of the display panel is located at the position where a longer side edge of the display panel is located means that the first warping face 1111 faces the position where the longer side edge of the display panel is located, and that the projection of the second warping face 1112 in the direction perpendicular to the displaying face of the display panel is located at the position where a shorter side edge of the display panel is located means that the second warping face 1112 faces the position where the shorter side edge of the display panel is located. That can ensure that the curved-surface corner 111 formed by the first warping face 1111 and the second warping face 1112 can face the corner of the display panel, which ensures that the problem of light leakage happening at the corners of the display panel is ameliorated.

Figure 4:
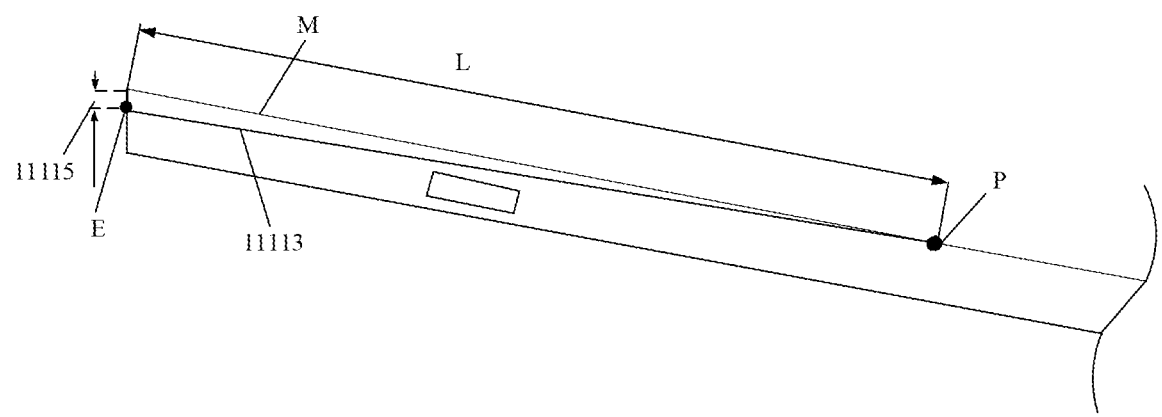
FIG. 4 illustrates a second schematic cross-sectional view along the A-A in FIG. 2 of the first warping face of the plastic frame according to an embodiment of the present disclosure.
Figure 5:
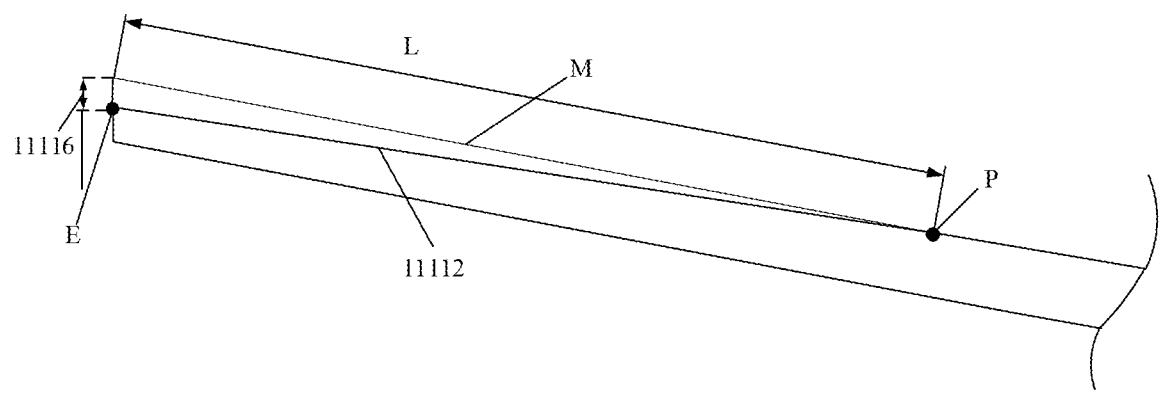
FIG. 5 illustrates a third schematic cross-sectional view along the A-A in FIG. 2 of the first warping face of the plastic frame according to an embodiment of the present disclosure.

Optionally, as shown in FIG. 3, if the light-leakage amount of the display panel is a first light-leakage amount, the warping degree of the first warping face 1111 is a second warping degree. As shown in FIG. 4, if the light-leakage amount of the display panel is a second light-leakage amount, the warping degree of the first warping face 1111 is a third warping degree. As shown in FIG. 5, if the light-leakage amount of the display panel is a third light-leakage amount, the warping degree of the first warping face 1111 is a fourth warping degree. The second light-leakage amount is within a preset light-leakage range of the display panel, the first light-leakage amount is less than the second light-leakage amount, and the third light-leakage amount is greater than the second light-leakage amount. The second warping degree is less than the third warping degree, and the third warping degree is less than the fourth warping degree.

It should be noted that the preset range refers to the range of the light-leakage amount of the display panel when it is at the average value, i.e., when the display panel has a medium-scale light leakage. Accordingly, if the light-leakage amount of the display panel is the second light-leakage amount, the warping degree of the first warping face 1111 is the third warping degree; in other words, when the display panel has a medium-scale light leakage, the warping degree of the first warping face 1111 is the third warping degree.

Because the first light-leakage amount is less than the second light-leakage amount, and the third light-leakage amount is greater than the second light-leakage amount, if the light-leakage amount of the display panel is the first light-leakage amount, the warping degree of the first warping face 1111 is the second warping degree; in other words, when the display panel is in the slight light-leakage level, the warping degree of the first warping face 1111 is the second warping degree, and when the display panel is in the serious light-leakage level, the warping degree of the first warping face 1111 is the fourth warping degree. Moreover, because the second warping degree is less than the third warping degree, and the third warping degree is less than the fourth warping degree, when the display panel has different light-leakage levels, the first warping face 1111 having the different warping degrees is more beneficial to pertinently ameliorating the problem of light leakage of the display panel.

Optionally, if the light-leakage amount of the display panel 2 is the first light-leakage amount, the brightness of the light leaking site of the region of the display panel 2 where light leakage happens is less than 0.4 nit. If the light-leakage amount of the display panel 2 is the second light-leakage amount, the brightness of the light leaking site of the region of the display panel 2 where light leakage happens is greater than or equal to 0.4 nit, and less than 0.6 nit. If the light-leakage amount of the display panel 2 is the third light-leakage amount, the brightness of the light leaking site of the region of the display panel 2 where light leakage happens is greater than or equal to 0.6 nit.

It should be noted that nit represents the luminous intensity in unit area, wherein if the nit value is higher, the luminous intensity is higher, which indicates that the light leakage of the display panel 2 is in a more serious degree. In other words, in the case of a slight light leakage, the brightness of the light leaking site of the region of the display panel 2 where light leakage happens is less than 0.4 nit. In the case of a medium-scale light leakage, the brightness of the light leaking site of the region of the display panel 2 where light leakage happens is greater than or equal to 0.4 nit. If the display panel 2 has a serious light leakage, the brightness of the light leaking site of the region of the display panel 2 where light leakage happens is greater than or equal to 0.6 nit.

Optionally, as shown in FIG. 3, if the warping degree of the first warping face 1111 is the second warping degree, the connecting line between the end of the curved surface and the end of a flat face of the bearing face 11 is a first curve 11111, and, as shown in FIG. 5, if the warping degree of the first warping face 1111 is the fourth warping degree, the connecting line between the end of the curved surface and the end of the flat face of the bearing face 11 is a second curve 11112. Both of the first curve 11111 and the second curve 11112 are tangent to the end of the flat face of the bearing face 11, and the curvature of the first curve 11111 is less than the curvature of the second curve 11112, wherein the flat face of the bearing face 11 is a face of the bearing face 11 other than the curved surface, the end of the flat face refers to one end of the flat face that is closer to the curved surface, and the end of the curved surface refers to one end of the curved surface that is further from the flat face.

It should be noted that the curvature refers to the rotation rate of the direction angle of the tangent line of a certain point in a curve relative to the arc length, is defined by differentiation, and represents the extent of the deviation of the curve from a straight line. Because if the warping degree of the first warping face 1111 is the second warping degree, the connecting line between the end of the curved surface and the end of the flat face of the bearing face 11 is a first curve 11111, and if the warping degree of the first warping face 1111 is the fourth warping degree, the connecting line between the end of the curved surface and the end of the flat face of the bearing face 11 is the second curve 11112, the curving degree of the first warping face 1111 when the display panel is in the slight light-leakage level is less than the curving degree when the display panel is in the serious light-leakage level. Further, because the stress exerted on the display panel when the display panel is in the slight light-leakage level is less than the stress exerted on the display panel when the display panel is in the serious light-leakage level, when the stress of the display panel is increased, the bearing face 11 of a higher curving degree is required to disperse the stress, so that the components of the stress can be dispersed on the first warping face 1111 to the largest extent, which ensures that, when the display panel is in the serious light-leakage level, the stress exerted on the display panel can be reduced. As shown in FIGS. 3, 4 and 5, the end of the curved surface is at the position where the point E is located, the end of the flat face of the bearing face 11 is at the position where the point P is located, and the bearing face 11 when the corners of the plastic frame 1 have not undergone the curved-surface treatment is shown by the flat face where the M is located in FIGS. 3, 4 and 5.

In some other embodiments, as shown in FIG. 4, if the warping degree of the first warping face 1111 is the third warping degree, the connecting line between the end of the curved surface and the end of a flat face of the bearing face 11 is a first straight line 11113, wherein the flat face of the bearing face 11 is a face of the bearing face 11 other than the curved surface, the end of the flat face refers to one end of the flat face that is closer to the curved surface, and the end of the curved surface refers to one end of the curved surface that is further from the flat face.

It should be noted that, if the warping degree of the first warping face 1111 is the third warping degree, or, in other words, the display panel has a medium-scale light leakage, when the display panel is pressed or squeezed, the stress exerted by the display panel is of an average level; in other words, the included angle between the stress and the component on the bearing face 11 of the stress is also an average value. Accordingly, if the connecting line between the end of the curved surface and the end of the flat face of the bearing face 11 is the first straight line 11113, the first warping face 1111 is an inclined face, and inclines toward the end of the plastic frame 1. Accordingly, once the display panel has stress concentration, the stress can be dispersed toward the end of the plastic frame 1, so that the stress is dispersed toward the exterior of the plastic frame 1, which can also prevent stress concentration.

Furthermore, in some embodiments, as shown in FIG. 3, if the warping degree of the first warping face 1111 is the second warping degree, the distance between the end of the curved surface and the flat face is a first distance 11114. As shown in FIG. 4, if the warping degree of the first warping face 1111 is the third warping degree, the distance between the end of the curved surface and the flat face is a second distance 11115. As shown in FIG. 5, if the warping degree of the first warping face 1111 is the fourth warping degree, the distance between the end of the curved surface and the flat face is a third distance 11116. The first distance 11114 is less than the second distance 11115, and the second distance 11115 is less than the third distance 11116. The end of the flat face refers to one end of the flat face that is closer to the curved surface, and the end of the curved surface refers to one end of the curved surface that is further from the flat face.

It should be noted that, because the first distance 11114 is less than the second distance 11115, the distance between the end of the curved surface and the flat face when the display panel has a medium-scale light leakage is greater than the distance between the end of the curved surface and the flat face when the display panel has a slight light leakage. Accordingly, when the stress is increased, the distance by which the deformation amount generated by pressing or squeezing of the display panel is cushioned toward the bearing face 11 is increased, and thus the space within which the stress is released is correspondingly increased. Likewise, because the second distance 11115 is less than the third distance 11116, the distance between the end of the curved surface and the flat face when the display panel has a medium-scale light leakage is less than the distance between the end of the curved surface and the flat face when the display panel has a serious light leakage. Accordingly, when the stress is increased, the distance by which the deformation amount generated by pressing or squeezing of the display panel is cushioned toward the bearing face 11 is increased, and thus the space within which the stress is released is correspondingly increased. In conclusion, by ensuring the distance by which the deformation amount generated by pressing or squeezing of the display panel is cushioned toward the bearing face 11, it can be ensured that there is a sufficient space for the stress to be released, and it can be ensured that the stress can be dispersed.

Optionally, the second distance 11115 is equal to a first numerical value, wherein the first numerical value refers to the deviation amount of the bearing face 11 in the direction further away from the display panel when the light-leakage amount of the display panel is within the preset light-leakage range.

It should be noted that, because the first numerical value refers to the deviation amount of the bearing face 11 in the direction further away from the display panel when the light-leakage amount of the display panel is within the preset light-leakage range, or, in other words, the first numerical value refers to the deviation amount of the bearing face 11 in the direction further away from the display panel when the display panel has a medium-scale light leakage, if the first distance 11114 is less than the second distance 11115, and the second distance 11115 is less than the third distance 11116, it can be ensured that, in both of the cases that the display panel has a medium-scale light leakage and that the display panel has a serious light leakage, there can be a suitable space for the stress to be released.

Figure 6:
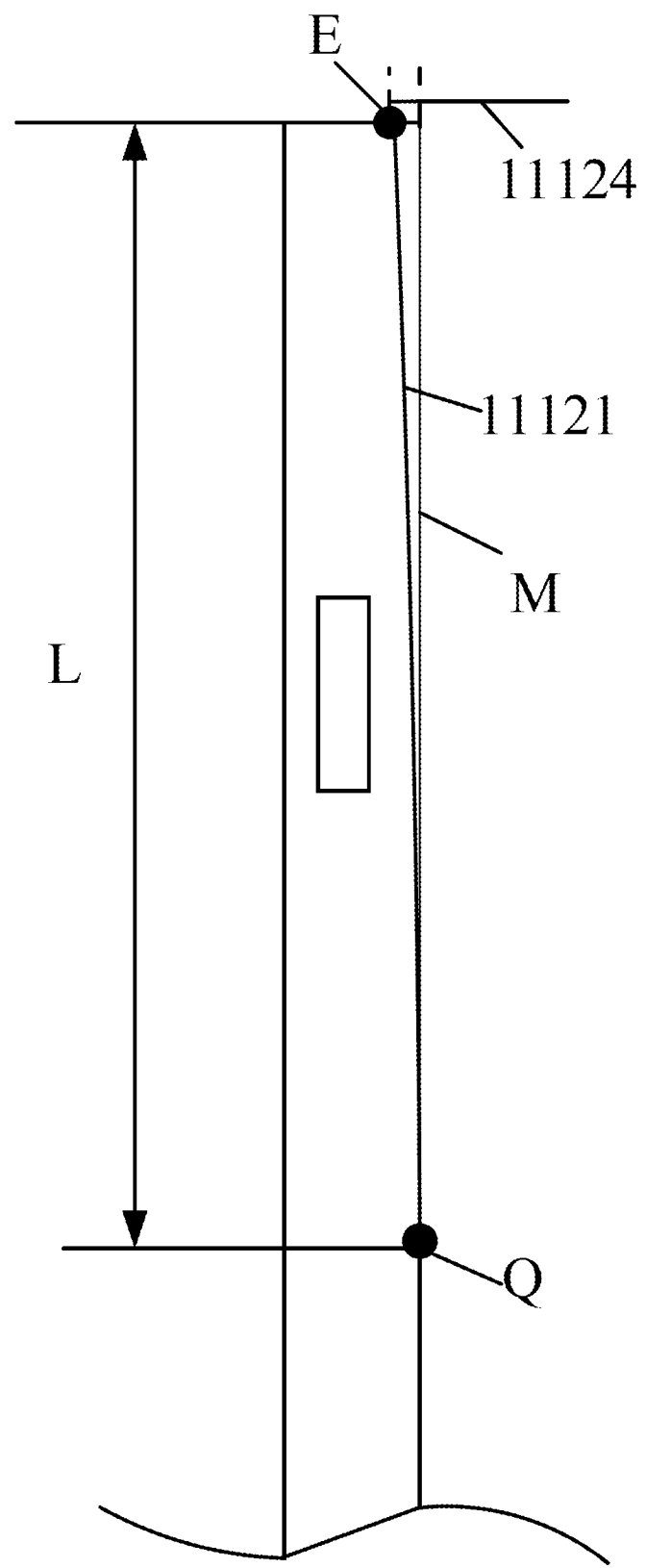
FIG. 6 illustrates a first schematic cross-sectional view along the B-B in FIG. 2 of the second warping face of the plastic frame according to an embodiment of the present disclosure.
Figure 7:
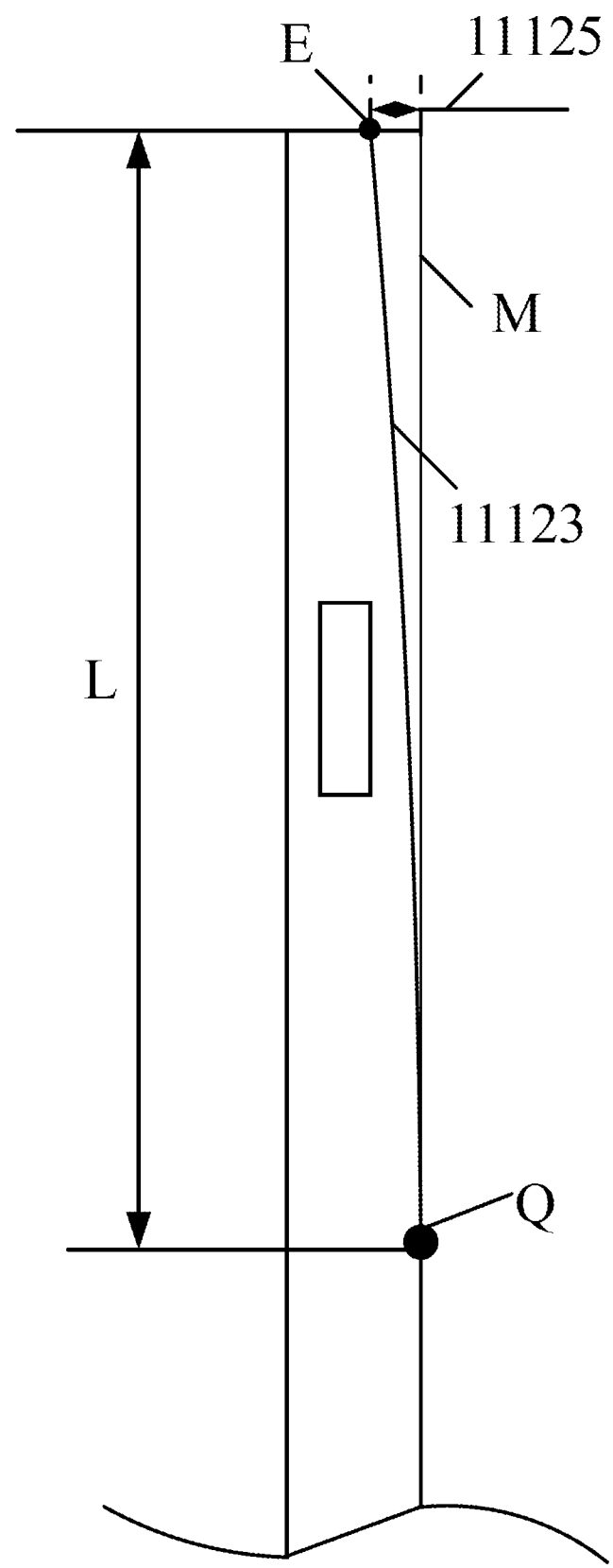
FIG. 7 illustrates a second schematic cross-sectional view along the B-B in FIG. 2 of the second warping face of the plastic frame according to an embodiment of the present disclosure.
Figure 8:
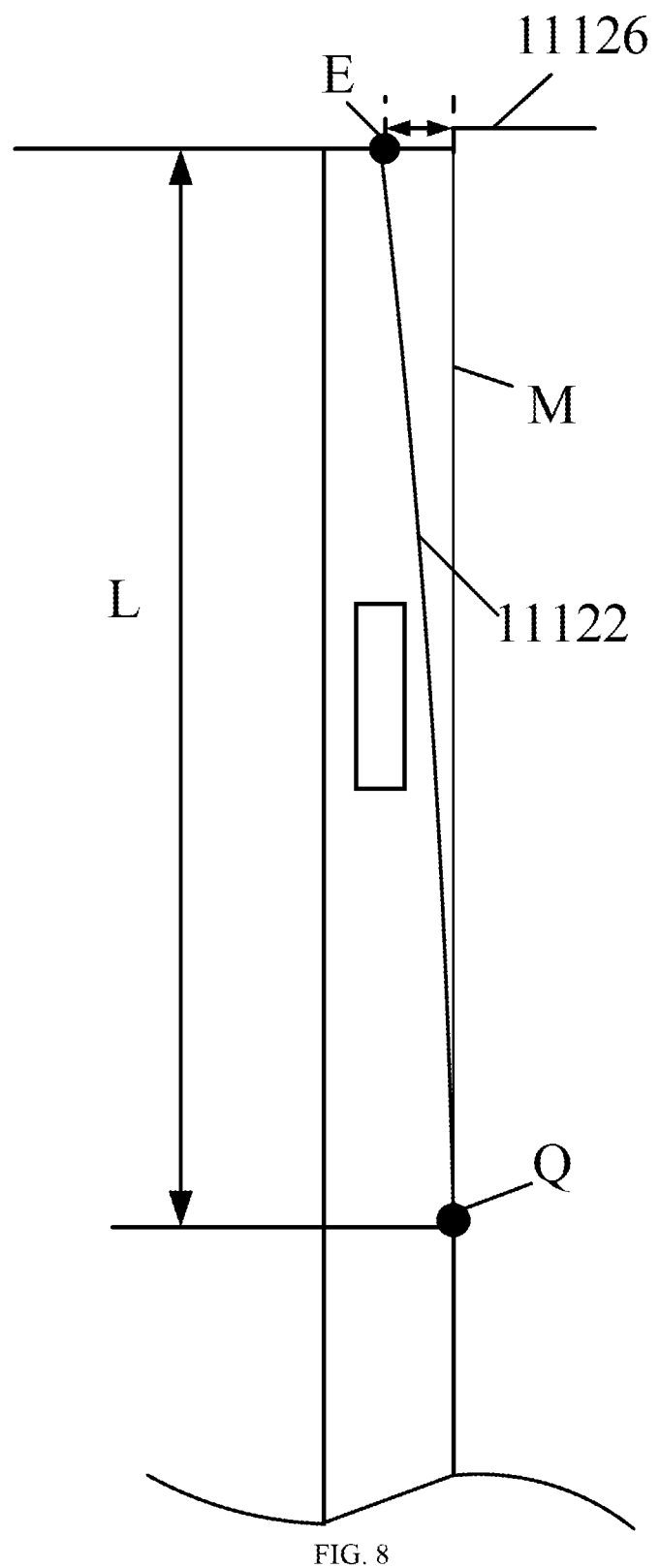
FIG. 8 illustrates a third schematic cross-sectional view along the B-B in FIG. 2 of the second warping face of the plastic frame according to an embodiment of the present disclosure.

Likewise, as shown in FIG. 6, if the light-leakage amount of the displaying module is the first light-leakage amount, the warping degree of the second warping face 1112 is a fifth warping degree. As shown in FIG. 7, if the light-leakage amount of the displaying module is the second light-leakage amount, the warping degree of the second warping face 1112 is a sixth warping degree. As shown in FIG. 8, if the light-leakage amount of the displaying module is the third light-leakage amount, the warping degree of the second warping face 1112 is a seventh warping degree. The second light-leakage amount refers to the average value of the light-leakage amount when the displaying module has light leakage, the first light-leakage amount is less than the second light-leakage amount, and the third light-leakage amount is greater than the second light-leakage amount. The fifth warping degree is less than the sixth warping degree, and the sixth warping degree is less than the seventh warping degree.

It should be noted that the preset range refers to the range of the light-leakage amount of the display panel when it is at the average value, i.e., when the display panel has a medium-scale light leakage. Accordingly, if the light-leakage amount of the display panel is the second light-leakage amount, the warping degree of the second warping face 1112 is the sixth warping degree; in other words, when the display panel has a medium-scale light leakage, the warping degree of the second warping face 1112 is the sixth warping degree. Because the first light-leakage amount is less than the second light-leakage amount, and the third light-leakage amount is greater than the second light-leakage amount, if the light-leakage amount of the display panel is the first light-leakage amount, the warping degree of the second warping face 1112 is the fifth warping degree; in other words, when the display panel is in the slight light-leakage level, the warping degree of the second warping face 1112 is the fifth warping degree, and when the display panel is in the serious light-leakage level, the warping degree of the second warping face 1112 is the seventh warping degree. Moreover, because the fifth warping degree is less than the sixth warping degree, and the sixth warping degree is less than the seventh warping degree, when the display panel has different light-leakage levels, the second warping face 1112 having the different warping degrees is more beneficial to pertinently ameliorating the problem of light leakage of the display panel.

It should also be noted that, when the first warping face and the second warping face have the equal light-leakage level, the brightnesses of the light leaking site of the region of the display panel 2 where light leakage happens are equal. In other words, if the light-leakage amount of the display panel 2 is the first light-leakage amount, the brightness of the light leaking site of the region of the display panel 2 where light leakage happens is less than 0.4 nit. If the light-leakage amount of the display panel 2 is the second light-leakage amount, the brightness of the light leaking site of the region of the display panel 2 where light leakage happens is greater than or equal to 0.4 nit, and less than 0.6 nit. If the light-leakage amount of the display panel 2 is the third light-leakage amount, the brightness of the light leaking site of the region of the display panel 2 where light leakage happens is greater than or equal to 0.6 nit.

Particularly, in some embodiments, as shown in FIG. 6, if the warping degree of the second warping face 1112 is the fifth warping degree, the connecting line between the end of the curved surface and the end of a flat face of the bearing face 11 is a third curve 11121, and, as shown in FIG. 8, if the warping degree of the second warping face 1112 is the seventh warping degree, the connecting line between the end of the curved surface and the end of the flat face of the bearing face 11 is a fourth curve 11122. Both of the third curve 11121 and the fourth curve 11122 are tangent to the end of the flat face of the bearing face 11, and the curvature of the third curve 11121 is less than the curvature of the fourth curve 11122, wherein the flat face of the bearing face 11 is a face of the bearing face 11 other than the curved surface, the end of the flat face refers to one end of the flat face that is closer to the curved surface, and the end of the curved surface refers to one end of the curved surface that is further from the flat face.

It should be noted that the curvature refers to the rotation rate of the direction angle of the tangent line of a certain point in a curve relative to the arc length, is defined by differentiation, and represents the extent of the deviation of the curve from a straight line. Because if the warping degree of the second warping face 1112 is the fifth warping degree, the connecting line between the end of the curved surface and the end of the flat face of the bearing face 11 is the third curve 11121, and if the warping degree of the second warping face 1112 is the seventh warping degree, the connecting line between the end of the curved surface and the end of the flat face of the bearing face 11 is the fourth curve 11122, the curving degree of the second warping face 1112 when the display panel is in the slight light-leakage level is less than the curving degree when the display panel is in the serious light-leakage level. Further, because the stress exerted on the display panel when the display panel is in the slight light-leakage level is less than the stress exerted on the display panel when the display panel is in the serious light-leakage level, when the stress of the display panel is increased, the bearing face 11 of a higher curving degree is required to disperse the stress, so that the components of the stress can be dispersed on the second warping face 1112 to the largest extent, which ensures that, when the display panel is in the serious light-leakage level, the stress exerted on the display panel can be reduced.

In some other embodiments, if the warping degree of the second warping face 1112 is the sixth warping degree, the connecting line between the end of the curved surface and the end of a flat face of the bearing face 11 is a second straight line 11123, wherein the flat face of the bearing face 11 is a face of the bearing face 11 other than the curved surface, the end of the flat face refers to one end of the flat face that is closer to the curved surface, and the end of the curved surface refers to one end of the curved surface that is further from the flat face.

It should be noted that, if the warping degree of the second warping face 1112 is the sixth warping degree, or, in other words, the display panel has a medium-scale light leakage, when the display panel is pressed or squeezed, the stress exerted by the display panel is of an average level; in other words, the included angle between the stress and the component on the bearing face 11 of the stress is also an average value. Accordingly, if the connecting line between the end of the curved surface and the end of the flat face of the bearing face 11 is the second straight line 11123, the second warping face 1112 is an inclined face, and inclines toward the end of the plastic frame 1. Accordingly, once the display panel has stress concentration, the stress can be dispersed toward the end of the plastic frame 1, so that the stress is dispersed toward the exterior of the plastic frame 1, which can also prevent stress concentration.

Optionally, as shown in FIG. 6, if the warping degree of the second warping face 1112 is the fifth warping degree, the distance between the end of the curved surface and the flat face is a fourth distance 11124. As shown in FIG. 7, if the warping degree of the second warping face 1112 is the sixth warping degree, the distance between the end of the curved surface and the flat face is a fifth distance 11125. As shown in FIG. 8, if the warping degree of the second warping face 1112 is the seventh warping degree, the distance between the end of the curved surface and the flat face is a sixth distance 11126. The fourth distance 11124 is less than the fifth distance 11125, and the fifth distance 11125 is less than the sixth distance 11126, wherein the end of the flat face refers to one end of the flat face that is closer to the curved surface, and the end of the curved surface refers to one end of the curved surface that is further from the flat face.

It should be noted that, because the fourth distance 11124 is less than the fifth distance 11125, the distance between the end of the curved surface and the flat face when the display panel has a medium-scale light leakage is greater than the distance between the end of the curved surface and the flat face when the display panel has a slight light leakage. Accordingly, when the stress is increased, the distance by which the deformation amount generated by pressing or squeezing of the display panel is cushioned toward the bearing face 11 is increased, and thus the space within which the stress is released is correspondingly increased. Likewise, because the fifth distance 11125 is less than the sixth distance 11126, the distance between the end of the curved surface and the flat face when the display panel has a medium-scale light leakage is less than the distance between the end of the curved surface and the flat face when the display panel has a serious light leakage. Accordingly, when the stress is increased, the distance by which the deformation amount generated by pressing or squeezing of the display panel is cushioned toward the bearing face 11 is increased, and thus the space within which the stress is released is correspondingly increased. In conclusion, by ensuring the distance by which the deformation amount generated by pressing or squeezing of the display panel is cushioned toward the bearing face 11, it can be ensured that there is a sufficient space for the stress to be released, and it can be ensured that the stress can be dispersed. As shown in FIGS. 6, 7 and 8, the end of the curved surface is at the position where the point E is located, the end of the flat face of the bearing face 11 is at the position where the point Q is located, and the bearing face 11 when the corners of the plastic frame 1 have not undergone the curved-surface treatment is shown by the flat face where the M is located in FIGS. 6, 7 and 8.

Optionally, the sixth distance 11126 is equal to a second numerical value, wherein the second numerical value refers to the deviation amount of the bearing face 11 in the direction further away from the display panel when the light-leakage amount of the displaying module is within the preset light-leakage range.

It should be noted that, because the second numerical value refers to the deviation amount of the bearing face 11 in the direction further away from the display panel when the light-leakage amount of the displaying module is within the preset light-leakage range, or, in other words, the second numerical value refers to the deviation amount of the bearing face 11 in the direction further away from the display panel when the display panel has a medium-scale light leakage, if the fifth distance 11125 is less than the sixth distance 11126, and the sixth distance 11126 is less than the seventh distance, it can be ensured that, in both of the cases that the display panel has a medium-scale light leakage and that the display panel has a serious light leakage, there can be a suitable space for the stress to be released.

Optionally, the warping degree of the first warping face 1111 is equal to the warping degree of the second warping face 1112.

It should be noted that, because the warping degree of the first warping face 1111 is equal to the warping degree of the second warping face 1112, it can be ensured that, when the display panel is in any one of the light-leakage situations, the effects of dispersing the stress of the display panel by the first warping face 1111 and the second warping face 1112 are equal, which ensures that the problem of light leakage of the display panel is ameliorated.

Optionally, all of the four corners of the plastic frame 1 are the curved-surface corner 111.

It should be noted that, if all of the four corners of the plastic frame 1 are the curved-surface corner 111, the problems of light leakage of all of the four corners of the display panel can be ameliorated, which further improves the effect of displaying of the displaying module It can be seen from the above embodiments that, in the embodiments of the present disclosure, the first position of the bearing face 11 of the plastic frame 1 is a curved surface, and the curved surface curves in the direction further away from the display panel, whereby the warping degree of the curved surface is the first warping degree, wherein the first position is the position of the bearing face 11 that faces the second position of the display panel, and the second position refers to the position where the region between two facing lateral sides of the region of the display panel where light leakage happens is located. Therefore, the curved surface of the bearing face 11 of the frame and the region of the display panel where light leakage happens are in facing positions. Accordingly, when the display panel is pressed or squeezed and thus is deformed, the curved surface at the first position of the bearing face 11 of the plastic frame 1 can cause the stress to be dispersed, to prevent stress concentration, which reduces the stress at the corners of the display panel, thereby ameliorating the problem of light leakage of the displaying module, to improve the effect of displaying of the displaying module.

Furthermore, an embodiment of the present disclosure further provides a displaying device, wherein the displaying device comprises the displaying module according to any one of the embodiments stated above. The advantageous effects of the displaying device are the same as the advantageous effects of the displaying module according to the above embodiments, and are not discussed further in the embodiments of the present disclosure.

It should be noted that the embodiments of the description are described in the mode of progression, each of the embodiments emphatically describes the differences from the other embodiments, and the same or similar parts of the embodiments may refer to each other.

Although alternative embodiments of the embodiments of the present disclosure have been described, once a person skilled in the art has known the essential inventive concept, he may make further variations and modifications on those embodiments. Therefore, the appended claims are intended to be interpreted as including the alternative embodiments and all of the variations and modifications that fall within the scope of the embodiments of the present disclosure.

Finally, it should also be noted that, herein, relation terms such as first and second are merely intended to distinguish one entity from another entity, and that does not necessarily require or imply that those entities have therebetween any such actual relation or order. Furthermore, the terms "include", "comprise" or any variants thereof are intended to cover non-exclusive inclusions, so that articles or terminal devices that include a series of elements do not only include those elements, but also include other elements that are not explicitly listed, or include the elements that are inherent to such articles or terminal devices. Unless further limitation is set forth, an element defined by the wording "comprising a . . . " does not exclude additional same element in the article or terminal device comprising the element.

The technical solutions of the present disclosure have been described in detail above. The principle and the embodiments of the present disclosure are described herein with reference to the particular examples. Moreover, for a person skilled in the art, according to the principle and the implementations of the present disclosure, the particular embodiments and the range of application may be varied. In conclusion, the contents of the description should not be understood as limiting the present disclosure.

The invention claimed is:

1. A displaying module, the displaying module comprising a back plate, a light guide plate fixed to the back plate, a plastic frame covering the back plate and a display panel located on the plastic frame, wherein the plastic frame is of a shape of an annular frame, and the plastic frame comprises a bearing face, a bottom face opposite to the bearing face, and an inner annular face perpendicular to the bottom face;
the display panel covers the bearing face, the bottom face abuts the back plate, and the light guide plate is fixed in a fixing space enclosed by the inner annular face; and
a first position of the bearing face of the plastic frame is a curved surface, and the curved surface curves in a direction further away from the display panel, whereby a warping degree of the curved surface is a first warping degree, wherein the first position is a position of the bearing face that faces a second position of the display panel, the second position is a position of a region of the display panel where light leakage happens, and the first warping degree is equal to a warping degree of the display panel when the display panel curves,
wherein the plastic frame is a square plastic frame, four corners of the plastic frame include at least one curved-surface corner, a bearing face of the curved-surface corner is a curved surface, and a length of two sides intersecting at the curved-surface corner is a first length, wherein the first length is a distance between two facing lateral sides of the region of the display panel where light leakage happens, and
wherein the curved-surface corner comprises a first warping face and a second warping face,
the first warping face and the second warping face intersect, a projection of the first warping face in a direction perpendicular to a displaying face of the display panel is located at a position where a longer side edge of the display panel is located, and a projection of the second warping face in the direction perpendicular to the displaying face of the display panel is located at a position where a shorter side edge of the display panel is located, wherein the longer side edge and the shorter side edge are two intersecting sides of the display panel, and a length of the longer side edge is greater than a length of the shorter side edge, and
both of the first warping face and the second warping face curve in the direction further away from the display panel.

2. The displaying module according to claim 1, wherein if a light-leakage amount of the displaying module is a first light-leakage amount, a warping degree of the first warping face is a second warping degree;
if a light-leakage amount of the display panel is a second light-leakage amount, the warping degree of the first warping face is a third warping degree; and
if the light-leakage amount of the display panel is a third light-leakage amount, the warping degree of the first warping face is a fourth warping degree, wherein the second light-leakage amount is within a preset light-leakage range of the display panel, the first light-leakage amount is less than the second light-leakage amount, and the third light-leakage amount is greater than the second light-leakage amount; and
the second warping degree is less than the third warping degree, and the third warping degree is less than the fourth warping degree.

3. The displaying module according to claim 2, wherein if the warping degree of the first warping face is the second warping degree, a connecting line between an end of the curved surface and an end of a flat face of the bearing face is a first curve, and if the warping degree of the first warping face is the fourth warping degree, a connecting line between the end of the curved surface and the end of the flat face of the bearing face is a second curve; and both of the first curve and the second curve are tangent to the end of the flat face of the bearing face, and a curvature of the first curve is less than a curvature of the second curve, wherein the flat face of the bearing face is a face of the bearing face other than the curved surface, the end of the flat face refers to one end of the flat face that is closer to the curved surface, and the end of the curved surface refers to one end of the curved surface that is further from the flat face.

4. The displaying module according to claim 2, wherein if the warping degree of the first warping face is the third warping degree, a connecting line between an end of the curved surface and an end of a flat face of the bearing face is a first straight line;

wherein the flat face of the bearing face is a face of the bearing face other than the curved surface, the end of the flat face refers to one end of the flat face that is closer to the curved surface, and the end of the curved surface refers to one end of the curved surface that is further from the flat face.

5. The displaying module according to claim 2, wherein if the warping degree of the first warping face is the second warping degree, a distance between the end of the curved surface and the flat face is a first distance;

if the warping degree of the first warping face is the third warping degree, the distance between the end of the curved surface and the flat face is a second distance; and if the warping degree of the first warping face is the fourth warping degree, the distance between the end of the curved surface and the flat face is a third distance;

wherein the first distance is less than the second distance, and the second distance is less than the third distance, wherein the end of the flat face refers to one end of the flat face that is closer to the curved surface, and the end of the curved surface refers to one end of the curved surface that is further from the flat face.

6. The displaying module according to claim 5, wherein the second distance is equal to a first numerical value, wherein the first numerical value refers to a deviation amount of the bearing face in the direction further away from the display panel when the light-leakage amount of the display panel is within the preset light-leakage range.

7. The displaying module according to claim 1, wherein if the light-leakage amount of the display panel is the first light-leakage amount, a brightness of a light leaking site of the region of the display panel where light leakage happens is less than 0.4 nit;

if a light-leakage amount of the display panel is a second light-leakage amount, the brightness of the light leaking site of the region of the display panel where light leakage happens is greater than or equal to 0.4 nit, and less than 0.6 nit; and if the light-leakage amount of the display panel is a third light-leakage amount, the brightness of the light leaking site of the region of the display panel where light leakage happens is greater than or equal to 0.6 nit.

8. The displaying module according to claim 1, wherein if a light-leakage amount of the display panel is a first light-leakage amount, a warping degree of the second warping face is a fifth warping degree;

if a light-leakage amount of the display panel is a second light-leakage amount, the warping degree of the second warping face is a sixth warping degree; and if the light-leakage amount of the display panel is a third light-leakage amount, the warping degree of the second warping face is a seventh warping degree, wherein the second light-leakage amount refers to an average value of the light-leakage amount when the display panel has light leakage, the first light-leakage amount is less than the second light-leakage amount, and the third light-leakage amount is greater than the second light-leakage amount; and the fifth warping degree is less than the sixth warping degree, and the sixth warping degree is less than the seventh warping degree.

9. The displaying module according to claim 8, wherein if the warping degree of the second warping face is the fifth warping degree, a connecting line between an end of the curved surface and an end of a flat face of the bearing face is a third curve, and if the warping degree of the second warping face is the seventh warping degree, a connecting line between the end of the curved surface and the end of the flat face of the bearing face is a fourth curve; and both of the third curve and the fourth curve are tangent to the end of the flat face of the bearing face, and a curvature of the third curve is less than a curvature of the fourth curve, wherein the flat face of the bearing face is a face of the bearing face other than the curved surface, the end of the flat face refers to one end of the flat face that is closer to the curved surface, and the end of the curved surface refers to one end of the curved surface that is further from the flat face.

10. The displaying module according to claim 8, wherein if the warping degree of the second warping face is the sixth warping degree, a connecting line between an end of the curved surface and an end of a flat face of the bearing face is a second straight line;

wherein the flat face of the bearing face is a face of the bearing face other than the curved surface, the end of the flat face refers to one end of the flat face that is closer to the curved surface, and the end of the curved surface refers to one end of the curved surface that is further from the flat face.

11. The displaying module according to claim 8, wherein if the warping degree of the second warping face is the fifth warping degree, a distance between the end of the curved surface and the flat face is a fourth distance;

if the warping degree of the second warping face is the sixth warping degree, the distance between the end of the curved surface and the flat face is a fifth distance; and if the warping degree of the second warping face is the seventh warping degree, the distance between the end of the curved surface and the flat face is a sixth distance;

wherein the fourth distance is less than the fifth distance, and the fifth distance is less than the sixth distance, wherein the end of the flat face refers to one end of the flat face that is closer to the curved surface, and the end of the curved surface refers to one end of the curved surface that is further from the flat face.

12. The displaying module according to claim 11, wherein the sixth distance is equal to a second numerical value, wherein the second numerical value refers to a deviation amount of the bearing face in the direction further away from the display panel when the light-leakage amount of the display panel is within the preset light-leakage range.

13. The displaying module according to claim 1, wherein a warping degree of the first warping face is equal to a warping degree of the second warping face.

14. The displaying module according to claim 1, wherein all of the four corners of the plastic frame are the curved-surface corner.

15. A displaying device, wherein the displaying device comprises the displaying module according to claim 1.

\* \* \* \* \*